United States Patent
Hrazdera et al.

(10) Patent No.: US 6,990,399 B2
(45) Date of Patent: Jan. 24, 2006

(54) AGRICULTURAL UTILITY VEHICLE AND METHOD OF CONTROLLING SAME

(75) Inventors: Oliver Hrazdera, Neuhofen an der Krems (AT); Karl Huber, Walding (AT)

(73) Assignee: CNH America LLC, New Holland, PA (US)

( * ) Notice: Subject to any disclaimer, the term of this patent is extended or adjusted under 35 U.S.C. 154(b) by 42 days.

(21) Appl. No.: 10/698,833

(22) Filed: Oct. 31, 2003

(65) Prior Publication Data

US 2005/0055147 A1 Mar. 10, 2005

(30) Foreign Application Priority Data

Oct. 31, 2002 (DE) ............................... 102 50 694

(51) Int. Cl.
G05D 1/00 (2006.01)
G06F 7/70 (2006.01)
(52) U.S. Cl. .................. 701/50; 701/301; 348/120
(58) Field of Classification Search ............... 701/50, 701/301, 23, 28, 25, 24; 348/118, 119, 120
See application file for complete search history.

(56) References Cited

U.S. PATENT DOCUMENTS

| | | | |
|---|---|---|---|
| 5,107,946 A * | 4/1992 | Kamimura et al. ......... 180/169 |
| 5,410,479 A * | 4/1995 | Coker .......................... 701/23 |
| 5,928,309 A * | 7/1999 | Korver et al. ............... 701/214 |
| 5,938,709 A * | 8/1999 | Hale et al. ................... 701/50 |
| 5,995,895 A * | 11/1999 | Watt et al. .................... 701/50 |
| 6,016,713 A * | 1/2000 | Hale ........................ 73/864.45 |
| 6,038,500 A | 3/2000 | Weiss |
| 6,128,574 A | 10/2000 | Diekhans |
| 6,345,231 B2 | 2/2002 | Quincke |
| 6,356,819 B1 * | 3/2002 | Winslow ...................... 701/23 |
| 6,445,983 B1 * | 9/2002 | Dickson et al. ............... 701/23 |
| 6,728,607 B1 * | 4/2004 | Anderson ..................... 701/25 |
| 6,738,695 B1 * | 5/2004 | Motz et al. ................... 701/23 |
| 6,804,587 B1 * | 10/2004 | O Connor et al. ............ 701/26 |
| 2003/0130766 A1 * | 7/2003 | Braunhardt et al. ........... 701/1 |

FOREIGN PATENT DOCUMENTS

| | | |
|---|---|---|
| DE | 196 29 618 A1 | 1/1998 |
| DE | 197 10 082 A1 | 10/1998 |
| DE | 197 42 463 A1 | 4/1999 |
| DE | 198 30 858 A1 | 1/2000 |
| DE | 199 21 996 A1 | 11/2000 |
| DE | 199 14 829 A1 | 1/2001 |
| EP | 1004230 A2 * | 5/2000 |

* cited by examiner

Primary Examiner—Michael J. Zanelli
(74) Attorney, Agent, or Firm—John William Stader

(57) ABSTRACT

An agricultural utility vehicle includes a computer to execute the steps of storing data representing steering direction, position and speed of the agricultural vehicle; recognizing repeated drive events wherein each drive event comprises a plurality of serially performed functions including changing steering direction, changing speed and changing lift position of a hitch of the agricultural utility vehicle; displaying each function on a screen and enabling a user to skip functions and execute subsequent functions; executing the functions to automatically control the vehicle on private areas, which are determined in accordance with means for sensing position; blocking execution of the functions in public areas; deactivating control when obstacles are encountered, wherein the obstacles are recognized by way of signals received from cameras mounted on the agricultural vehicle; and periodically prompting a user for input.

9 Claims, 1 Drawing Sheet

ND OF THE INVENTION

The disclosure is directed to an agricultural utility vehicle and a method of controlling the same. In particular, the vehicle's route and mode of driving on non-public, agriculturally exploited areas is controlled.

BACKGROUND OF THE INVENTION

Agricultural utility vehicles with drive management systems and/or field-end management systems are known and undertake more and more control tasks in the vehicles. These field-end management systems (abbreviated to FEMS) are based upon storing a certain recurring sequence of operations which occur at an end of a field in a read-only memory, for example, and then each time the end of the field is reached letting this stored data run again through individual switching operations.

There are several systems on the market related to storing and recording data. Such systems store data either through selection of each of the desired functions of the series via a VDU screen or by pressing a start programming key before the driver performs the desired sequence and subsequently pressing the storage key on correct running of the action.

There are also several solutions on the market for calling up the stored information at the field end. In one form of implementation each individual one of the stored functions is acknowledged by means of an ergonomically arranged key before it is executed. An advantage of this solution is that the driver has the opportunity to determine where, when and whether a part action or part function of the stored overall function is started. The disadvantage is that the driver must constantly press one or more keys and his attention must constantly be directed towards where and when the function in question is to be called up, in order to be able to guarantee that an appropriate action is performed automatically at the right time and at the correct place, e.g. turning the agricultural vehicle at the field end.

In another form of implementation the sequence of all the stored actions or functions occurs in a train one after the other, after an initiate key has been pressed once. Here too there are two variants. In one, the sequence of desired functions occurs with exactly the same timing as when it was first stored. In another variant the control occurs in accordance with the stored path, which was followed for storage between the individual actions. The advantage of both versions lies in the infrequency of action required from the driver. The disadvantage is the driver's difficulty in deciding when the performance of the stored tasks must start, in order to be able to guarantee the appropriate execution of the actions at the field end when turning, for example. (The lifting gear should be at the correct height before the field end is actually reached, but also not too soon, as otherwise parts of the field would not be treated.)

Also, solutions for automatically steered vehicles are known on the market. These agricultural utility vehicles are controlled by using GPS location over the fields. Automatic drive management systems are possible only along or on certain drive tracks. Automatically functioning field-end management systems with an integrated turning event are not possible however with conventional solutions.

From DE 196 29 618 A1 a very comprehensive route planning system for agricultural utility vehicles with a defined working width are known, in which the data processing device (EDP system/computer, a so-called farm computer) is employed for generation of treatment path sequences on a field, into which both individual or multiple field-specific data, in particular coordinates for field boundaries and also one or more data specific to the utility vehicle, such as for example the working width or other vehicle specific data, can be input. On the basis of the field-specific and utility-vehicle-specific data in the electronic data processing device, using a computing algorithm which exhibits at least one optimization criterion for the desired treatment route, the treatment route sequence is generated in the form of a digitized treatment route. A simple balancing of the data with the actual values for the run occurs during operation in an electronic evaluation unit on the utility vehicle. Inclusion of the actual values in the original route planning does not take place. Previously known obstacles are entered into the system and taken account of for route planning. The working line, i.e. the edge of the crop, is monitored with suitable devices and is taken into account when following the track and control of the agricultural utility vehicle on site.

From DE 197 10 082 A1 a drive system for utility vehicles, in particular agricultural or industrial tractors, with an electric generator driven by an internal combustion engine and an electric motor fed from the generator and functioning as a drive with at least one steering axle is known, in which its wheels are steered either together or individually by steering actuators. In addition, manual control elements for at least the driving function of steering and speed setting are arranged, the signals from which are balanced in a process computer with automatically determined signals, in which further signals from further components or other control elements or speed settings are evaluated and compared and in which real time behavior and control are optimized. At the same time automatic, parallel and independently working functional modules are selected and the associated actuator systems operated by means of the process computer. The disadvantage is that no automated drive management or field-end management system is practicable.

From the technical solution in accordance with DE 197 42 463 A1 a process for computer-supported filing of geo-referenced parameters, in particular agricultural yields, which are determined at one stroke, especially along driving tracks with a collecting device, are known. At the same time an approximation of the measurement points to the course of the field boundary is produced. In doing so the field is filed with computer support.

From DE 198 30 858 A1 a device and a procedure are known for determining a virtual position of an agricultural vehicle or implement with a satellite receiving unit (GPS antenna) for position determination in a three dimensional terrestrial reference system, in which the agricultural vehicle or implement is equipped with an evaluation unit (AWE), which with the data received from the satellite receiver unit determines the absolute position of at least one reference point spatially separated from the location of the satellite receiving unit. At the same time the spatial distance between the satellite receiving unit and the reference point is recorded quantitatively. Sensors are arranged for determining the position of the vehicle, i.e. direction and orientation of the vehicle in the horizontal plane of the terrestrial reference system and/or the longitudinal or transverse inclination of the vehicle relative to the vertical direction of the reference system. The evaluation unit possesses a store, in which the precise position and attitude of the vehicle can be stored. In the event of deviations from preset values the determined deviation is displayed appropriately.

From DE 199 14 829 A1 a system and a procedure for in particular graphical monitoring and/or remote control of stationary and/or mobile devices for HGV supports, construction machinery, agricultural vehicles, container stands and/or containers are known, where by means of a reporting device from an information center outwards communication to the mobile device takes place over at least two communication channels. The mobile device possesses a first functional block for recording measured values, for monitoring and/or giving out an alarm in accordance with assignable rules and a second functional block for storing application-specific data for the mobile device. The behavior of the mobile device is visualized in the information center, which monitors the device and if necessary intervenes via an alarm system.

In DE 199 21 996 A1 a device for the application of agricultural material, such as for example, fertilizer, sprays, etc. with a reservoir container and at least one metering device, from which the material is delivered by means of applicator elements in adjustable quantities is described. There a control device is arranged, which possesses a storage medium, in which a nutrient or fertilizer card is stored and which is provided with a position transducer for producing field coordinate signals for indicating the relative position of the vehicle on a field. At the same time movement over the field is followed. The control device possesses among other things an operating mode, where the first application run or working run (cycle) on the field serves at the same time as the so-called learning run. In doing so the individual operating parameters, such as position of the drive tracks, the working width, edge scattering, boundary scattering and/or obstacles, etc., with their actual position on the field are filed in the storage medium as control and/or regulating parameters with positional data for the following application runs and/or working processes as control or regulating parameters.

An advantage of the embodiments is to create a process for controlling an agricultural utility vehicle that automates the drive management and/or field end management, and simplifies operation for the driver.

SUMMARY OF THE INVENTION

The process in accordance with the invention serves especially for controlling the route and the manner of driving an agricultural utility vehicle on private agricultural areas. The agricultural utility vehicle is at the same time equipped with devices for determining, storing and controllably altering the direction of travel, the travelling speed, the engine speed, the gear ratio, the speed of each individual driving wheel and/or all the driving wheels and the operation of implements. Furthermore, the position, the width, the treatment width, the actuation and the position of the coupled load or of a coupled, mounted implement are determined and stored. For its control the agricultural utility vehicle is equipped with a satellite supported navigation system (GPS), an ultrasonic device, a radar device and sensors for recording and recognizing fixed or movable obstacles. In it for automating drive management there is arranged within the view and operating range of the driver an on-board computer with exchangeable data medium, control panel and VDU screen including a radio interface. In addition it has for speed control at least one automatic speed controller and devices for switching over to different speed ranges. Equipment for automatic control of the direction of travel, travelling speed, control of the load or of the coupled, mounted implement, the drive management system and the position of the lifting gear is arranged on it. The individual driving and control data and operating functions can be displayed optionally both visually and/or acoustically.

According to the invention, by means of the above equipment, devices, sensors and installations all the data for the route, manner of driving and mode of working of the agricultural utility vehicle including the coupled load or of a coupled mounted implement, time- and/or path- and/or position- and/or event-relevant data are stored, evaluated and if necessary displayed in a timed sequence. The appropriate implied software in the on-board computer recognizes repeated drive management events, displays these in timed mode if required and stores all the necessary driving-relevant data. Therefore this drive management can be performed repeatedly automatically or partially automatically. At the same time the individual functions of the management system are invocable and switchable by the operator as a whole or in driving blocks and/or in timed, independent steps. Individual items of the driving management can if necessary be ignored by the operator. For reasons of safety drive management independent of a possible initiation by the operator in public traffic space is blocked, so that no operating errors at all are possible. During the trip the agricultural utility vehicle automatically recognizes via the drive management system movable or unforeseen fixed obstacles (persons, animals, masts, stones, trees or other objects) and deactivates the drive management system immediately or with a delay. If the operator does not intervene, the agricultural utility vehicle comes to a standstill. Regardless of this situation, the operator's attention is constantly monitored and the vehicle comes to a standstill automatically, if the operator does not react. Such monitoring functions can be performed in a kind of dead man's function, as is usual e.g. on the railways. In other forms of implementation, eye movements, the gaze position or the frequency of blinks of the eyelids can be monitored by means of suitable sensors and from this conclusions can be drawn regarding the driver's attention. Through this, damage to the very expensive machinery of the agricultural utility vehicle can reliably be avoided.

Preferably the process in accordance with the preferred embodiments for controlling an agricultural utility vehicle is employed at the field end, where it means a considerable saving in working time. In doing so all the data concerning the route, mode of driving and mode of working including the changes in speed and direction of travel and of the complete turning event of the agricultural utility vehicle including the coupled load or of a coupled, mounted implement, time- and/or path- and/or position- and/or event-relevant data are stored and evaluated. If required, they are optionally displayable, storable and changeable in individual steps, in driving blocks or as a whole. Hence repeated drive management actions can be recognized, displayed and repeatedly performed automatically at the field end. At the same time the on-board computer processes all the information in such a way that even in a self-learning mode it can recognize, optimize and control automatically all the actions that comprise field-end management. At the same time according to an embodiment, at the field end the functions of drive management are switchable and hence also programmable by the operator as a whole or in drive blocks and/or in timed, individual steps, where individual items of drive management at the field end can if necessary be faded out or skipped over. The drive management system is automatically blocked in public traffic spaces and cannot be faded out or skipped over.

With the GPS system or the camera system, as soon as the vehicle reaches the public traffic space, (e.g. even on merely crossing a road to get from one field to another) the agricultural utility vehicle reacts only to the steering commands of the operator.

Especially at the field end, on automatic recognition of obstacles, the drive management system is deactivated immediately or after time delay in order to avoid damage. Thus it is programmable, that, for example, in the event of movable obstacles being encountered, the agricultural utility vehicle immediately comes to a standstill, while in the case of fixed obstacles these are first displayed and only after further approach, if in the meantime no reaction of the operator has occurred, it comes to a standstill. The operating facility of an emergency pushbutton for immediate disabling of the drive and/or field end management systems is advantageous.

Also the camera system is designed so that it can automatically recognize the point where the relevant actuators of the agricultural utility vehicle and the mounted implement start, in order for example to raise the mounted implement and initiate a turning event. In a special version the camera is designed to be also useable at night, i.e. it is equipped with residual light amplifiers or infrared sensors. Also further sensors, such as a distance finder, etc., can be arranged in addition, and their signals are likewise recorded and evaluated.

In another embodiment, especially for larger areas of agricultural land, it is advantageous if the drive management system for the agricultural utility vehicle is programmed separately in a computer with a high computing capacity independent of the utility vehicle. After input of all the relevant data a simulation of the planned operation occurs on this computer using an appropriate program. Through this on the one hand programming errors can be excluded and on the other hand it can be optimized using several different criteria (e.g. working time, spray consumption, loss of harvest, soil compaction, etc.). The result of the simulation is entered into the program for drive and/or field-end management in the on-board computer of the agricultural utility vehicle.

During the first and/or subsequent runs and the turning maneuver a comparison of the data for the programmed version with the currently recorded data is performed. This can lead to the programmed data in the on-board computer being corrected if necessary, in which the deviations and changes are displayed and if necessary confirmed. These modified, updated data from the on-board computer, which as a rule does not have such a high computing performance as the computer independent of the utility vehicle, are input to the utility-vehicle-independent computer via a radio interface by a radio or telecommunications link. Then a renewed simulation of the drive and/or field-end management takes place. These results are then passed on to the on-board computer of the agricultural utility vehicle by means of a constant data exchange, which automatically optimizes and controls the drive and/or field-end management of the agricultural utility vehicle.

In this way it is possible for the first time to optimize the drive and/or field-end management system in accordance with different criteria depending upon the operation in question, and environmental and weather conditions. Handling by the operator is simplified, as in the first instance it takes over a monitoring function. Possible operating errors are recognized in advance and can be avoided. Damage to the relevant machinery is minimized.

In a special form of implementation the process for controlling an agricultural utility vehicle can be qualified so that in the computer that is independent of the utility vehicle a virtual expanse of the relevant private (i.e., non-public) agriculturally used area to be treated is laid out. In doing so, however, the virtual expanse does not correspond to the actual external boundaries of the area to be treated. The boundaries of this virtual expanse are established variably when programming depending upon the agricultural utility vehicle employed and its coupled load and/or mounted implement. This is an advantage especially as often the exact actual boundaries of the area are not known precisely in advance, are not ascertainable or are too inexact. Hence considerable programming effort is saved. What is important is only the precise arranging or zeroing of the position and direction of travel of the agricultural utility vehicle on the field before starting deployment of the vehicle on site by means of appropriate known procedures, e.g. via GPS-supported systems. Then the drive or field-end management occurs in accordance with the previously described procedure.

In a further embodiment in the process for controlling an agricultural utility vehicle, when programming in the computer independent of the utility vehicle and/or the on-board computer instead of a virtual expanse a virtual grid is laid out over the relevant non-public, agriculturally exploited area. When doing so, the grid lines serve as the basis for controlling the drive management and/or field-end management depending upon the employed agricultural utility vehicle and its coupled load and/or mounted implement. The outermost lines are used at the same time as boundary lines, which may not be run over by the agricultural utility vehicle in automatic operation. This means increased protection of sensitive machinery. Through the subdivision of the area into individual grid fields, also individual grid fields or entire grid regions can be defined, where the automatic drive management and/or field-end management can be put out of action or, if necessary, alterations can be implemented in the field-end management functions. Thus, if within the area to be treated, obstacles, such as a body of water, stony ridges, hedge rows, single trees or groups of trees, exist, or in sloping areas, the speed can be reduced or, for example, for particular soil quality (little topsoil, then very stony beneath it), the coupled processing implement can be raised. This virtual grid opens up for the first time the possibility, even for very extensive agriculturally exploited areas, which are subdivided by or covered with so-called erosion protective plantings, that an economical drive management and/or field-end management system can be employed for the entire area. The individual lines of the grid can also run in curves. Finally through changing of the grid pattern there is no problem in adapting the control in accordance with the given conditions for the agriculturally exploited area. Suitable methods for the simulation are manageable on a computer with, for example, the finite element method. Furthermore, lines lying within the grid can be used for automatic control of the drive management and/or field end management system, in that on driving over them appropriate functions and/or actions of the agricultural utility vehicle including the coupled load and or the mounted implement are triggered. The individual grid intersections can if necessary be used for adjustment of the actual position via the GPS, so that the GPS system does not have to be in constant use.

The procedure for controlling an agricultural utility vehicle can advantageously be made more complete, if an automatic obstacle recognition system with an additionally arranged camera system is used, in which at least one camera provides a comparison signal and this is combined with at least the signals from another camera and/or other additionally arranged sensors and the information gained from this is preferably stored and evaluated in a separate microcomputer system. The evaluated information from this monitoring system is entered into the on-board computer so that this takes account of the immovable obstacles in its drive management. If during the automatic run the camera system recognizes moving obstacles, which are situated within an adjustable and previously established hazard space, the automatic drive management is warned and is overridden simultaneously and/or with a time delay. This means the machine would come to a standstill without intervention by the operator. Likewise the camera system can initiate the necessary actions (triggering the actuators) when it has recognized the field end.

DETAILED DESCRIPTION OF THE PREFERRED EMBODIMENT

Figure 1:
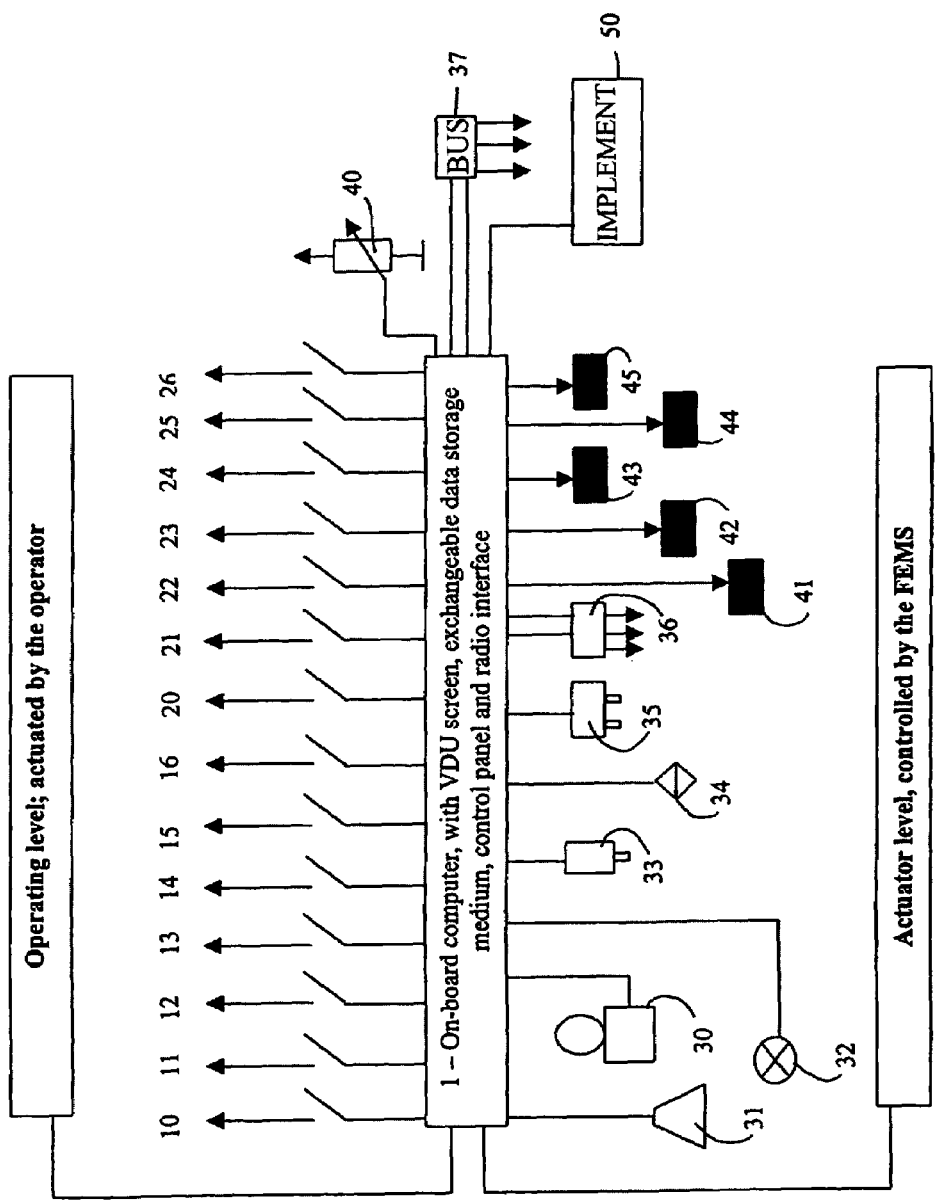
FIG. 1 is a block circuit diagram showing operating elements according to the preferred embodiment.

In the following paragraphs the invention will now be explained in more detail with an example embodiment using FIG. 1. It shows in a block circuit diagram the mode of action of the components and operating elements for performing the procedure in accordance with the preferred embodiment, with reference to a field-end management system. Then on reaching the turning sector in the first turning event all data corresponding to actuation by the operator of control switches arranged in one level in the operator's working zone are recorded and stored in the on-board computer (1). In particular, the following data are stored and evaluated: route data (i.e., the path traversed), operation of the steering, the manner of driving (i.e., the speed driven, changes of speed, reduction in speed), variable, automatic, speed-controller values, the speed of the PTO shaft coupled to the mounted implement, the position of the lifting gear and mode of working of the mounted implement including the changes in speed and direction of travel and the complete turning event for the agricultural utility vehicle. The turning event includes time, path, position and other event-relevant data for the coupled load or a coupled, mounted implement.

The data are collected in cycles and displayed to the operator on a Video Display Unit (VDU) screen or other display of the on-board computer (1). By means of the FEMS invoke key (10), activation of the FEMS mode (so-called learning mode) occurs and it begins with recording and display of the individual event-related data for the individual working cycles which run alongside each other or after each other. By pressing the FEMS store key (12), the individual working cycles are confirmed for correct execution and thus the course of the entire field-end management, e.g. a turning procedure at the field end, is stored step-by-step.

Timing of the individual steps can be varied. Through the timing, the quantity of information is restricted and is manageable by the operator. The FEMS ON/OFF key (11) enables the FEMS mode to be switched off if required, generally or during field-end management.

In order to review the stored field-end management, the second turning event at the same field end is also stored with the same timing and in the same manner and the individual steps are likewise displayed on the VDU screen of the on-board computer (1). When doing so, the operator can compare the individual data and steps directly and avoid errors or optimize the turning event if necessary. This optimized turning event is then repeatable automatically as often as one wants by pressing the field end management key (10)(FEMS-ON/OFF). But since the turning event differs often only slightly viewed over the whole width of the field, the operator can fade out or skip over individual items of the drive management at the field end, if required, by means of the FEMS transfer key (13). If the automatic field end management is switched on, the individual, automatically running working steps are displayed on the VDU screen. Thus at any time the operator is in a position to intervene via the appropriate keys.

With appropriate programming the on-board computer (1) is also in a position to determine an optimized turning event from more than two turning events and to integrate this into the field-end management with appropriate command inputs. This can take place for example also in the stand of the vehicle, if the recorded and stored data from two turning events are displayed on the on-board computer (1) and via appropriate operating keys a selection and switching through of the individual working steps occurs. Also an automatic track recognition and track following is possible without problems by means of the camera system in accordance with an embodiment, in that the tracks of preceding runs are monitored and the actual track is corrected and adjusted accordingly by means of the steering.

It is an advantage of the preferred embodiment that the function of drive management and/or field-end management is switchable by the operator at the field end optionally as a whole or in run blocks, which consist of several individual combined working steps, and/or in timed individual steps. In the public traffic space, i.e. when it has been determined through the GPS that the agricultural utility vehicle has reached the public traffic space, the drive management system is automatically blocked. An appropriate, conventional GPS navigation system can be implemented in the on-board computer (1), which at regular intervals of time determines location via a GPS receiving and transmitting unit including an antenna (30). For activating or switching off this system the implementation key (15) is arranged on the control panel. Preferably the time of reaching an intersection when a virtual grid that has been laid out over the entire surface of the agriculturally useful area exists is suitable for automated determination of the vehicle's location. For recognition of obstacles both a surroundings-scanning device (33), e.g., a laser scanner, also at least one movement-reporting sensor (34) can be arranged at an appropriate place on the agricultural utility vehicle. The movement-reporting sensor (34) can be arranged at several suitable points, such as at the outer edges or the protective covers of the agricultural machine and on the mounted implement. These signals can be coupled into the field-end management system via a special program. On overlapping of the signals the drive of the vehicle is disengaged and accordingly it is automatically braked briefly by means of suitable actuators. For a low-level signal, only the display on the VDU screen and the emission of an acoustic signal, which for example on approaching alters the pitch and loudness, are programmable. The signal display and/or evaluation take place via at least one arranged acoustic signaling device (31) or an optical signaling device (32). Also coupling of the individual signaling systems is possible.

At defined intervals the operator preferably must press a dead man's push-button (16) arranged in the operating zone. If the dead man's push-button (16) is not pressed at all or not within a particular time, e.g. after it lights up, the automatic field-end management system is automatically cancelled and the vehicle comes to a standstill and the coupled load or the relevant mounted implement is also disengaged. This dead man's push-button (16) can also be used in public traffic spaces.

In addition, the utility vehicle can be switched off quickly by the operator manually via an emergency push-button (14). In doing so both stopping of the utility vehicle itself and also uncoupling of the driven implements from the relevant drive is effected. This function can also be made variable in its actions. For this only the relevant programming needs to be altered.

As further operating keys for controlling the drive management, in the operating zone of the operator there are arranged a key for controlling and setting the lower value of the automatic speed controller (21) and a key for controlling and setting the upper value of the automatic speed controller (22). Thus it is possible to control the travelling speed automatically. Further optimization can be achieved by means of the key for controlling slippage (25) and the key for controlling the all-wheel drive (26).

Likewise the control of the mounted implements can occur via a key for controlling the accessory control devices (23). Thus, optimal settings for the mounted implements can be produced. By means of the key for engine speed (20) and the key for controlling the gearbox (24), a consumption-optimized control of the drive management is adjustable.

On the agricultural utility vehicle a camera receiving and control unit for monitoring of movable and/or immovable obstacles is installed as an additional monitoring unit. Their monitoring signals can, according to the process in accordance with the invention, likewise be included in the control of the field-end management system, in that these signals are brought into a suitable form for display, taken into account in the on-board computer with appropriate priority and can trigger appropriate control signals to the individual actuators of the agricultural utility vehicle.

The individual actuators are connected with the on-board computer (1) via a CAN bus (36), which forms the interface for signal input and signal output to the individual devices and actuators of the agricultural utility vehicle. The accessory control device (41), the gearbox (42), the slippage control device (43), the differential lock (44) and the all-wheel drive are cited here as possible actuators (connection is not shown in FIG. 1). Furthermore however, all the actuators are connected also directly with the on-board computer (1), e.g. for the purpose of monitoring. The same can be applied to the mounted implement (50) and its associated actuators, which are connected both via an ISO bus (37) and also directly to the on-board computer.

List of reference terms

1 On-board computer with VDU, exchangeable data medium, operating panel and radio interface
10 FEMS-invoke key
11 FEMS ON/OFF
12 FEMS storage key
13 FEMS transfer key
14 Emergency push-button
15 Implementation key
16 Dead Man's push-button
20 Key for controlling engine speed
21 Key for controlling the lower value of the automatic speed controller
22 Key for controlling the upper value of the automatic speed controller
23 Key for controlling accessory control devices -continued List of reference terms 24 Key for controlling the gearbox
25 Key for controlling slippage
26 Key for controlling the all-wheel drive
30 GPS receiving and transmitting unit including antenna
31 Acoustic signaling device
32 Optical signaling device
33 Surroundings-scanning device
34 Movement reporting sensors
35 Camera receiving and camera control unit
36 CAN bus to signal input and output to devices and actuators of the agricultural utility vehicle
37 ISO bus to signal input and output to the coupled load or to mounted implements and associated actuators
40 Engine
41 Additional control device or devices
42 Gearbox
43 Slippage control unit
44 Differential lock
45 All-wheel drive
50 Mounted implement

We claim:

1. An agricultural utility vehicle comprising a computer to execute the steps composing:
   storing data representing steering direction, position and speed of the agricultural vehicle;
   recognizing repeated drive events wherein each drive event comprises a plurality of serially performed functions including changing steering direction, changing speed and changing lift position of a hitch of the agricultural utility vehicle;
   displaying each function on a screen and enabling a user to skip functions and execute subsequent functions;
   executing the functions to automatically control the vehicle on private areas, which are determined in accordance with means for sensing position;
   blocking execution of the functions in public areas;
   deactivating control when obstacles are encountered, wherein the obstacles are recognized by way of signals received from cameras mounted on the agricultural vehicle; and
   periodically prompting a user for input.

2. A method of controlling an agricultural utility vehicle including means for determining the direction of travel, the travelling speed, the engine speed, the gear ratio, the speed of a drive wheel, the position of a coupled load or a coupled mounted implement, total width and treatment width of the coupled load, at least one automatic speed controller, a speed range changing switch, the method comprising the steps of:
   automatically controlling the direction of travel, the travelling speed, operation of the coupled load, a lifting gear position;
   storing data from the means for determining;
   recognizing repeated drive management events, wherein each drive management event includes a plurality of functions;
   displaying the functions as a whole or in at least one of route blocks and timed individual steps and permitting an operator to skip at least one of the plurality of functions;
   automatically blocking execution of the functions in a public traffic space; deactivating automatically execution of the functions when obstacles are encountered; and
   monitoring the operator's attention and stopping the vehicle if the operator does not react.

3. A method of controlling an agricultural vehicle according to claim 2, wherein the means for determining includes an on-board computer including an exchangeable data medium, a control panel, a display screen, and at least one of a radio interface, a satellite-supported navigation system, an ultrasonic device, a radar device and sensors for recording and recognition of at least one of fixed and movable obstacles, and the step of storing data includes storing data from the at least one of the satellite-supported navigation system, the ultrasonic device a radar device and sensors for recording and recognition of at least one of fixed and movable obstacles in the exchangeable data medium.

4. A method of controlling an agricultural utility vehicle according to claim 3, wherein,
   a) on a computer independent of the utility vehicle, a simulation takes place, a result of the simulation flows into a program and this program is entered into the on-board computer of the agricultural utility vehicle,
   b) a reconciliation of the data from the programmed version with the current data during at least one of the first and the following run and turning maneuver takes place, the data is corrected if necessary and the deviations and alterations are displayed,
   c) amended updated data is input via the radio interface into the computer which is independent of the utility vehicle, at the same time the simulation is run again,
   d) and by means of constant data exchange the program is automatically optimized.

5. A method of controlling an agricultural utility vehicle in accordance with claim 4, wherein,
   a) in the computer independent of the utility vehicle a virtual expanse of a non-public, agriculturally exploited area to be treated is laid out,
   b) and the boundaries of this virtual expanse are variably changeable depending upon the agricultural utility vehicle employed and at least one of its coupled load and mounted implement.

6. A method of controlling an agricultural utility vehicle in accordance with claim 5, wherein
   a) in at least one of the computer independent of the utility vehicle and the on-board computer a virtual grid is laid down for the relevant, non-public, agriculturally exploited area,
   b) at least one of the grid lines and intersections of the grid serve as the basis for controlling the agricultural utility vehicle depending upon the vehicle employed and at least one of its coupled load and mounted implement,
   c) the outermost lines are utilized simultaneously as boundary lines, which the vehicle may not drive over in automatic operation,
   d) while on crossing over at least one of the grid lines and intersections of the grid at least one of appropriate functions and actions of the agricultural utility vehicle including the coupled load are triggered.

7. A method of controlling an agricultural utility vehicle in accordance with claim 3, wherein,
   a) recognition of obstacles and a field end is effected with a camera system,
   b) in which at least one camera delivers comparison signals and these are combined with at least one of the signals from another camera and signals from other sensors and the information gained from this is stored and evaluated in a separate microcomputer system, and
   c) the evaluated information is entered into the on-board computer, which takes account of the immovable obstacles,
   d) for moving obstacles that are situated within a specified hazard area, warning the operator that the functions are deactivated either simultaneously or after a time delay.

8. A method of controlling an agricultural vehicle according to claim 2, wherein the agricultural vehicle includes sensors for recording and recognition of at least one of fixed and movable obstacles, and the step of deactivating automatically a drive management system when obstacles are encountered includes sensing the obstacles with the sensors, displaying the presence of the obstacles, and deactivating immediately or after a time delay after the presence of the obstacles are displayed.

9. A method of controlling an agricultural vehicle according to claim 2, wherein a drive management system can be deactivated via an emergency push-button.

* * * * *